(12) United States Patent
Ghosal et al.

(10) Patent No.: US 8,897,778 B2
(45) Date of Patent: Nov. 25, 2014

(54) INFRASTRUCTURE ASSISTED NETWORK TRANSITION

(75) Inventors: Sudip Ghosal, Cupertino, CA (US); David Sheldon Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 779 days.

(21) Appl. No.: 12/497,620

(22) Filed: Jul. 3, 2009

(65) Prior Publication Data

US 2011/0002295 A1    Jan. 6, 2011

(51) Int. Cl.
*H04W 36/00* (2009.01)
*H04W 36/24* (2009.01)

(52) U.S. Cl.
CPC .......... *H04W 36/0055* (2013.01); *H04W 36/24* (2013.01)
USPC ............ 455/436; 455/437; 455/443; 455/444

(58) Field of Classification Search
USPC ......... 455/423, 436, 418, 446, 447, 442, 525, 455/522, 7, 414.1–2, 572, 456.1, 406, 455/575.8, 527; 370/331, 338, 352, 255, 370/254, 235, 428, 401, 351, 318, 319
See application file for complete search history.

(56) References Cited

U.S. PATENT DOCUMENTS

| | | | |
|---|---|---|---|
| 7,047,037 B2 | 5/2006 | Ormson | |
| 7,082,301 B2 | 7/2006 | Jagadeesan et al. | |
| 7,363,037 B2 * | 4/2008 | Huang et al. | 455/436 |
| 7,383,046 B2 | 6/2008 | Jagadeesan et al. | |
| 7,515,909 B2 * | 4/2009 | Jain et al. | 455/436 |
| 7,733,836 B2 * | 6/2010 | Huseth | 370/338 |
| 2002/0082012 A1 * | 6/2002 | Wang et al. | 455/435 |

(Continued)

FOREIGN PATENT DOCUMENTS

| | | |
|---|---|---|
| EP | 0660627 A2 | 6/1995 |
| WO | 2005083912 A1 | 9/2005 |
| WO | 2008016778 A2 | 2/2008 |

OTHER PUBLICATIONS

Tariq M. Ali et al., "Performance Analysis Framework and Vertical Handover Triggering Algorithms for Voice over WLAN/Cellular Network", Wireless Communications and Networking Conference, 2008. pp. 3186-3190.

(Continued)

*Primary Examiner* — Kent Chang
*Assistant Examiner* — William Lu
(74) *Attorney, Agent, or Firm* — Edell, Shapiro & Finnan, LLC

(57) ABSTRACT

An infrastructure assisted network transition scheme is provided. In a multi-mode wireless communication device, handover threshold data is received from a management server associated with a first wireless network comprising one or more wireless access points. The multi-mode wireless communication device receives signals from the one or more wireless access point devices of the first wireless network and generates data representing the received signals. The multi-mode wireless communication device analyzes the data representing the received signals with respect to the handover threshold data to determine when the multi-mode wireless communication device should initiate hand-in to the first wireless network and when to initiate hand-out from the first wireless network to the second wireless network. Functions are provided at the management server to enable the generation of the handover threshold data from network configuration information associated with the first wireless network.

22 Claims, 9 Drawing Sheets

(56) References Cited

U.S. PATENT DOCUMENTS

| | | | |
|---|---|---|---|
| 2004/0137902 A1 | 7/2004 | Chaskar et al. | |
| 2005/0101329 A1* | 5/2005 | Gallagher | 455/436 |
| 2005/0143088 A1* | 6/2005 | Hirsbrunner et al. | 455/455 |
| 2005/0272426 A1* | 12/2005 | Yang et al. | 455/436 |
| 2005/0277416 A1* | 12/2005 | Tolli et al. | 455/436 |
| 2006/0019679 A1* | 1/2006 | Rappaport et al. | 455/456.5 |
| 2006/0116127 A1* | 6/2006 | Wilhoite et al. | 455/442 |
| 2006/0178147 A1* | 8/2006 | Jagadeesan et al. | 455/436 |
| 2006/0270411 A1* | 11/2006 | Grayson | 455/444 |
| 2007/0076664 A1* | 4/2007 | An et al. | 370/331 |
| 2007/0083470 A1* | 4/2007 | Bonner et al. | 705/51 |
| 2007/0140220 A1* | 6/2007 | Doradla et al. | 370/352 |
| 2007/0191013 A1* | 8/2007 | Gunnarsson et al. | 455/438 |
| 2007/0253339 A1* | 11/2007 | Ovadia et al. | 370/252 |
| 2008/0076430 A1* | 3/2008 | Olson | 455/440 |
| 2008/0253314 A1 | 10/2008 | Stephenson et al. | |
| 2008/0298281 A1* | 12/2008 | Hunkeler | 370/280 |
| 2009/0075648 A1* | 3/2009 | Reed et al. | 455/424 |
| 2009/0093252 A1* | 4/2009 | Czaja et al. | 455/436 |
| 2009/0235354 A1* | 9/2009 | Gray et al. | 726/22 |
| 2009/0280812 A1* | 11/2009 | Cheng et al. | 455/436 |
| 2009/0286510 A1* | 11/2009 | Huber et al. | 455/410 |
| 2010/0118830 A1 | 5/2010 | Stephenson et al. | |
| 2010/0226339 A1* | 9/2010 | Stephenson et al. | 370/332 |

OTHER PUBLICATIONS

Notification of Transmittal of the International Search Report and the Written Opinion dated Oct. 14, 2010 for PCT/US2010/038751.

English translation of Chinese Office Action in counterpart Chinese Application No. 201080029850.4, issued Nov. 29, 2014, 13 pages.

* cited by examiner

US 8,897,778 B2

INFRASTRUCTURE ASSISTED NETWORK TRANSITION

TECHNICAL FIELD

The present disclosure relates to wireless communication systems, and more particularly to systems in which a mobile wireless communication device can roam between two different types of wireless networks.

BACKGROUND

Wireless communication technologies have rapidly developed over the last several years to the point where a mobile device, such as a mobile cellular telephone or a multi-function mobile wireless device (capable of email, internet browsing, voice calls, etc.), is capable of operating in multiple wireless networks. For example, such a multi-mode wireless communication device may be capable of operating in a wireless local area network (WLAN), such as a WiFi™ network and also in a wide area wireless network, such as a cellular network. The multi-mode device may employ voice-over-internet protocol (VoIP) techniques when conducting a voice call via the WiFi network and more traditional circuit switching techniques when conducting a voice call via the cellular network. Consequently, the multi-mode device needs to reliably transition between the two different networks.

The timing and appropriateness of when a multi-mode device transitions into or out of a WLAN greatly affects the performance of one or more applications that may be active on the multi-mode device.

DESCRIPTION OF EXAMPLE EMBODIMENTS

Overview

An infrastructure assisted network transition scheme is provided. In a multi-mode wireless communication device, handover threshold data is received from a management server associated with a first wireless network comprising one or more wireless access points. The multi-mode wireless communication device receives signals from the one or more wireless access point devices of the first wireless network and generates data representing the received signals. The multi-mode wireless communication device analyzes the data representing the received signals with respect to the handover threshold data to determine when the multi-mode wireless communication device should initiate hand-in to the first wireless network and when to initiate hand-out from the first wireless network to the second wireless network.

At a management server associated with a first wireless network, network configuration information is received with respect to one or more access points operating in the first wireless network to serve wireless communication with one or more multi-mode wireless communication device. The network configuration information (e.g., access point locations and access transmitter power levels) indicates operating parameters for the one or more access points and locations of one or more handover regions where service to a multi-mode wireless communication device is to be handed-out from the first wireless network to a second wireless network. The management server generates handover threshold data from the network configuration information. In response to receiving a registration request from a multi-mode wireless communication device, the management server sends the handover threshold data to the multi-mode wireless communication device to assist the multi-mode wireless communication device in determining when to hand-in to the first wireless network and when to hand-out from the first wireless network to the second wireless network.

Example Embodiments

Figure 1:
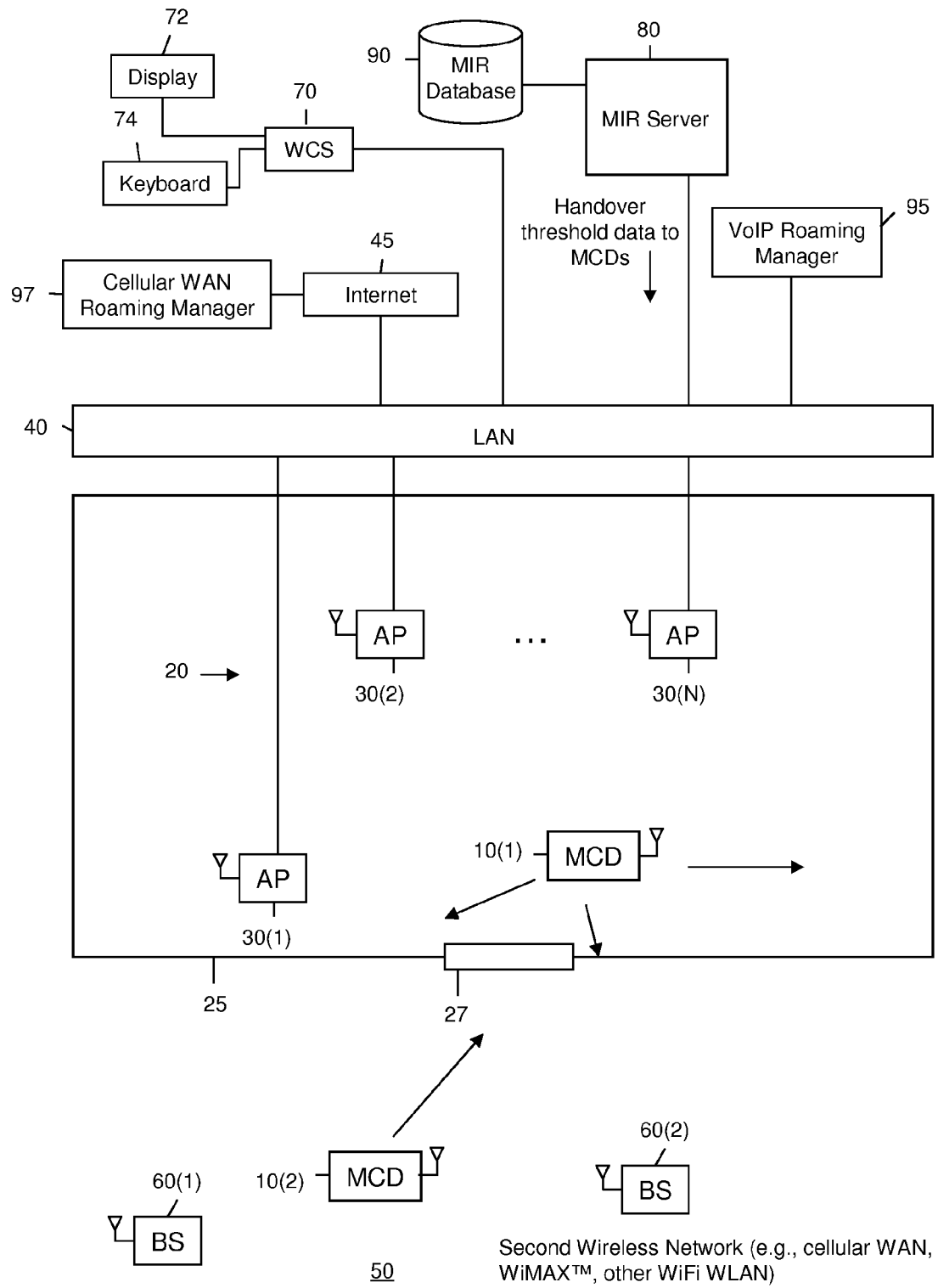
FIG. 1 is diagram of block diagram illustrating first and second wireless networks between which a multi-mode wireless communication device may transition, and in which network infrastructure associated with the first wireless network supplies information to assist the multi-mode wireless communication device in determining when to make a transition.

Referring first to FIG. 1, a wireless communication environment is shown where multi-mode wireless communication client device (MCDs) are provided that can roam between multiple wireless networks. Two MCDs 10(1) and 10(2) are illustrated as an example. Each of the MCDs may be capable of running voice, video and data applications over two or more wireless networks, such as a WiFi™ wireless local area network (WLAN), a wireless cellular wide area network (WAN), a WiMAX™ wireless network, etc. For example, a WLAN 20 is shown deployed within a building 25. The WLAN 20 comprises a plurality of wireless access points (APs) shown at 30(1)-30(N). Each of the APs 30(1)-30(N) is connected directly to a wired local area network (LAN) 40; alternatively, one or more of the APs 30(1)-30(N) could be a so-called "Mesh" AP which connects wirelessly to the LAN via a wired AP. The LAN 40 is connected to the Internet 45 via separate router devices and firewall equipment (not shown).

The building has an entrance/exit door shown at 27. Thus, users or MCDs 10(1) and 10(2) may enter and exit the building where the WLAN 20 is deployed via the door 27. In moving into and out of the building, or merely approaching the building from the outside, the MCDs may roam between a first wireless network, e.g., the WLAN 20, and a second wireless network. An example of a second wireless network is shown at 50, and again, this second wireless network 50, may be a cellular WAN, a WiMAX network, another WLAN (perhaps in a different administrative domain), etc. Base stations (BSs) are shown at 60(1) and 60(2) as part of the wireless infrastructure equipment of the second wireless network 50.

FIG. 1 shows that MCD 10(1) is currently operating in the first wireless network, e.g., WLAN 20 within the building 25, but that the MCD 10(1) may move about within the building 25 and eventually out of the building 25. The MCD 10(2) is currently operating in the second wireless network 50 and may move about and eventually close to or inside the building 25. When a MCD moves between wireless networks, it is said to require a handover between the two networks. With respect to the WLAN 20, a MCD is said to be "handed-in" when it transitions from operation in the second wireless network 50 into operation in the WLAN 20. Conversely, a MCD is said to be "handed-out" with respect to the WLAN 20 when it transitions from operation in the WLAN 20 to the second wireless network 50.

According to the techniques described herein, information is provided to the MCD from network infrastructure equipment associated with the WLAN 20 to assist the MCD in transitioning into or out of the WLAN 20. To this end, additional infrastructure equipment associated with the WLAN are provided and configured to generate this information. A wireless control server (WCS) 70 and a mobility intelligent roaming (MIR) server 80 are provided. There are a display 72 and a keyboard 74 associated with the WCS 70 to enable a network administrator to access network management software associated with the WLAN 20. The WCS 70, MIR server 80 and VoIP roaming manager 95 are connected to the LAN 40. The APs 30(1)-30(N) communicate with the WCS 70 via the WLAN 20 and the WLAN 40. For some applications, there may be additional intermediate wireless control devices to which the APs 30(1)-30(N) connect to in groups, and which wireless control devices in turn communicate to the WCS 70 and MIR server 80 via the Internet 45 or LAN 40. The APs shown in FIG. 1 are positioned at various locations around the building 25. For example, AP 30(1) is positioned relatively close in proximity to the door 27.

The MIR server 80 is also referred to herein as a management server and it is configured to generate handover threshold data that it communicates to MCDs to assist the MCDs in network transitioning. The MIR server stores the handover threshold data in a MIR database 90. The MIR may communicate the handover threshold data directly to MCDs or via the VoIP Roaming Manager 95. The WCS 70 is configured, using standard network mapping and user interface tools, to allow a network administrator to graphically convey information about the location of the physical deployments of APs 30(1)-30(N) in the WLAN 20. As described in more detail hereinafter, the WCS 70 supplies this WLAN deployment data to the MIR server 80 for use in computing the handover threshold data.

The MCD uses the handover threshold data when analyzing signals it receives from one or more of the APs 30(1)-30(N) in the WLAN 20 to determine when to generate a hand-in trigger or a hand-out trigger. Depending on the type of application currently running on the MCD at the time of a transition or at some point thereafter, the MCD sends the hand-in and/or hand-out trigger to network infrastructure equipment that is dedicated to managing roaming for a given application in the destination wireless network. For example, as shown in FIG. 1, there is a voice-over-IP (VoIP) roaming manager apparatus 95 to handle roaming of a voice call into the WLAN 20 and there is a cellular WAN roaming manager 97 to handle roaming of a data session (such as email, web browsing, texting, etc.) into the second wireless network 50.

The WCS 70 performs higher level network management functions associated with the APs 30(1)-30(N). For example, a network administrator uses the WCS 70 to configure the operational parameters of the radio transceivers in the APs. The network administrator also uses the WCS 70 to input the locations of APs on a building's floorplan; both the floorplan and AP locations are provided to the MIR server 80 for use in handover service functions.

The MIR server 80 is configured to generate the handover threshold data by analyzing information, supplied via the WCS 70, pertaining to the locations of APs 30(1)-30(N), transmit powers of the respective APs 30(1)-30(N), and other AP-specific information such as properties related to their antenna configurations. As explained further hereinafter, the handover threshold data comprises both hand-in threshold data used by an MCD to determine when to hand-in to the WLAN 20, and hand-out threshold data used by an MCD to determine when to hand-out from the WLAN 20. The MIR server 80 communicates the handover threshold data to the MCDs during certain events in their operation with respect to the WLAN 20. The handover threshold data does not depend on the type of application running on the MCD. An MCD may use its own network transitioning algorithms to determine when to transition between wireless networks, may use the handover threshold data for more reliable transitioning or may rely solely on the handover threshold data when transitioning between wireless networks.

Figure 2:
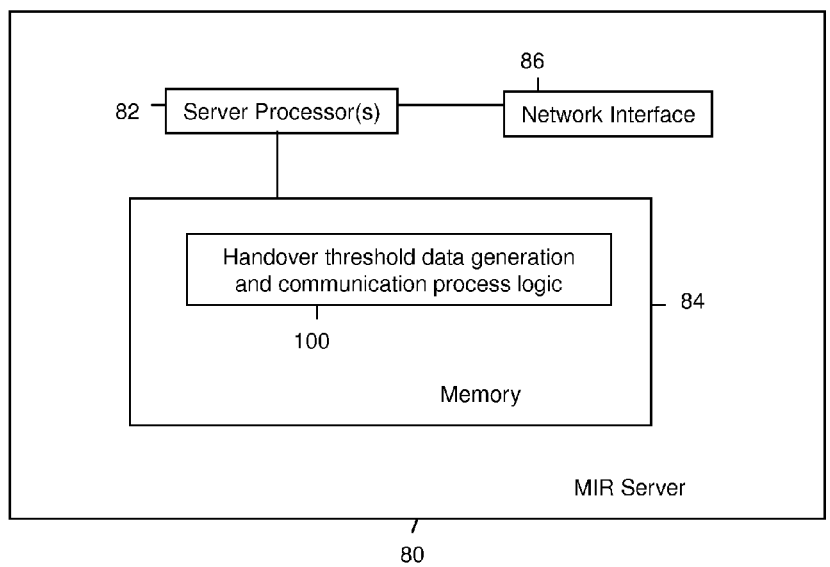
FIG. 2 is an example of a block diagram of a mobile intelligent roaming server that is configured with handover threshold generation data and communication process logic to send handover threshold data to multi-mode wireless communication devices.

Turning now to FIG. 2, an example of a block diagram of the MIR server 80 is shown. The MIR server 80 may be a programmable computing apparatus comprising one or more server data processors shown at 82 and memory 84 or other tangible storage media in which resides software instructions for handover threshold data generation and communication process logic 100. The server processors 82 execute the software instructions for handover threshold data generation and communication process logic 100 to generate and communicate the handover threshold data to MCDs. Communication to and from MCDs via the Internet 45 is made via a network interface 86. The process logic 100 is described in more detail hereinafter in conjunction with FIG. 4-7.

Figure 3:
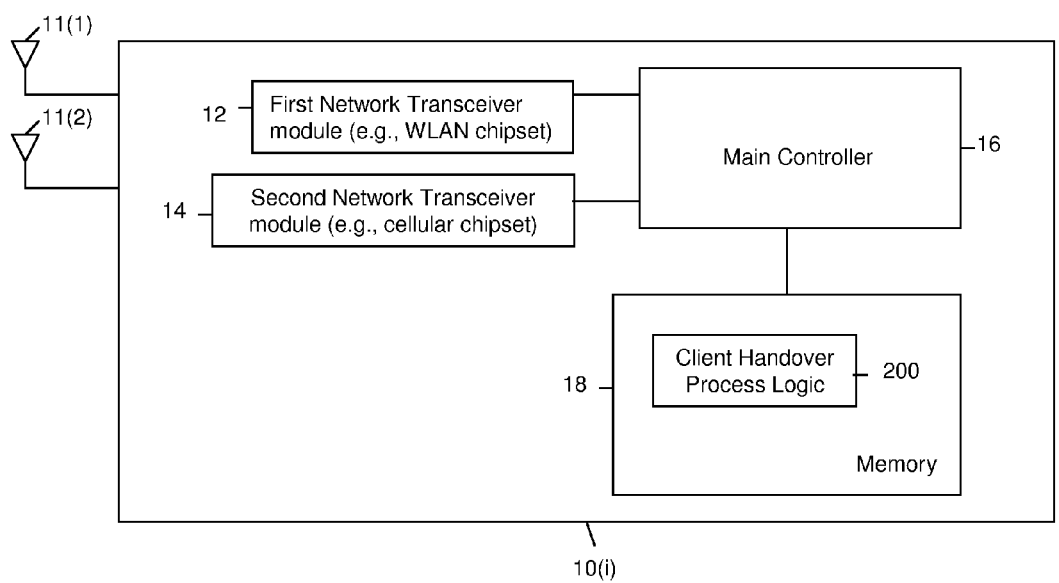
FIG. 3 is an example of a block diagram of a multi-mode wireless communication device configured with client handover process logic that analyzes handover threshold data received from the mobile intelligent roaming server to make network transition decisions.
Figure 4:
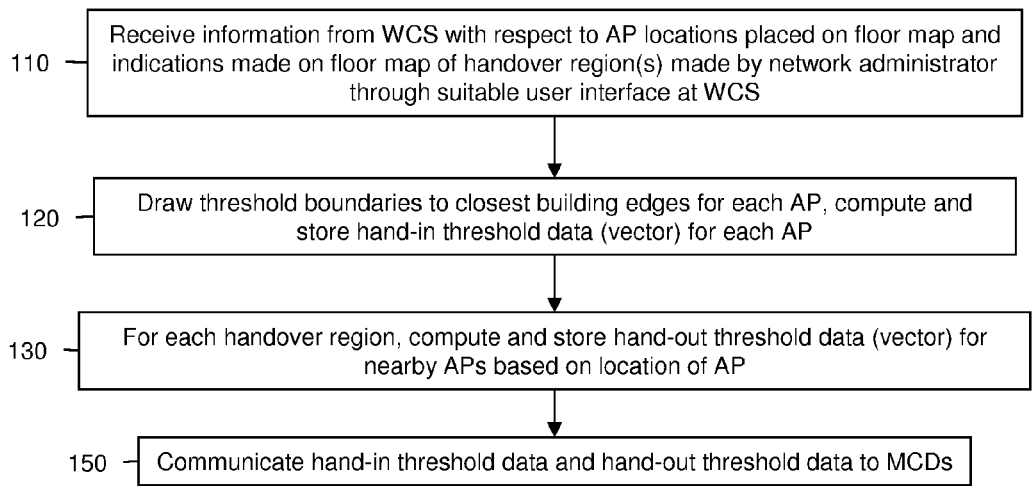
FIG. 4 is an example of a flow chart for the handover threshold data generation and communication process logic in the mobile intelligent roaming server.

Referring to FIG. 3, an example of a block diagram of an MCD, generally referred to as MCD 10(i), is shown. The MCD 10(i) comprises a first network transceiver module 12 and a second network transceiver module 14. Each of the modules 12 and 14 may receive and transmit signals by a dedicated one of antennas 11(1) and 11(2). In one example, the first network transceiver module 12 is configured to handle WLAN communications, and thus may be a WLAN chipset (RF transceiver, modem and controller) and the second transceiver module 14 is configured to handle wireless cellular WAN communications, and thus may be a cellular chipset (RF transceiver, modem and controller). A main controller 16 is provided that connects to the first and second network transceiver modules 12 and 14. The main controller 16 is, for example, a microprocessor, microcontroller, digital signal processor, or other programmable data processing device. Memory or other tangible storage media 18 is provided that stores software instructions for client handover process logic 200. The client handover process logic 200 is described in more detail hereinafter.

The process logic 100 and 200 may take any of a variety of forms, so as to be encoded in one or more tangible media for execution, such as with fixed logic or programmable logic (e.g., software/computer instructions executed by a processor). Moreover, the controller referred to above in FIG. 4 may be a programmable processor, programmable digital logic (e.g., field programmable gate array) or an application specific integrated circuit (ASIC) that comprises fixed digital logic, or a combination thereof.

Figure 5:
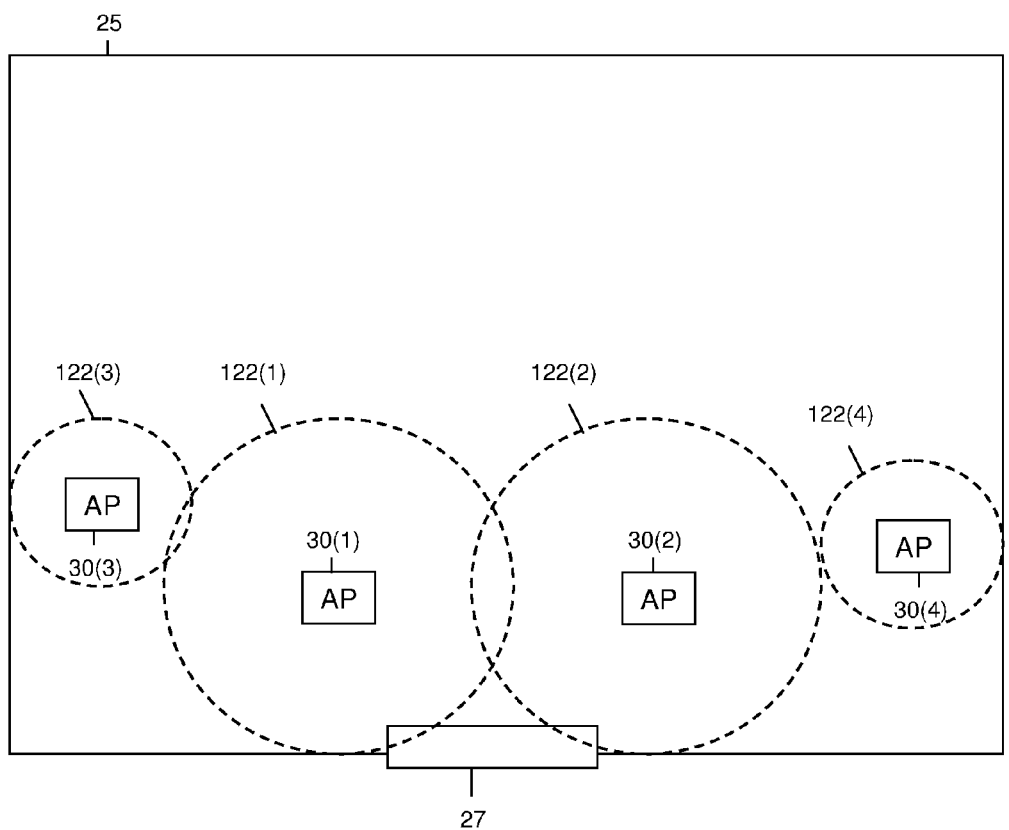
FIG. 5 is a diagram depicting a floor plan map from which data is generated to compute hand-in threshold data.
Figure 6:
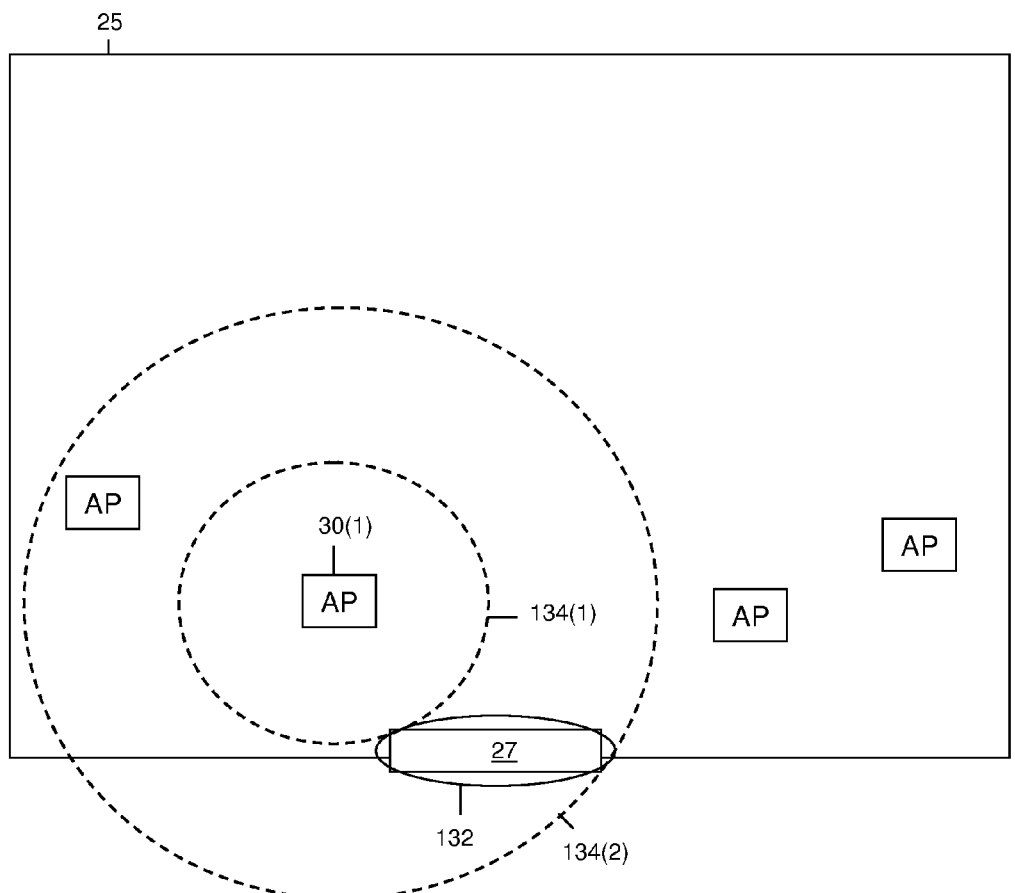
FIG. 6 is a diagram depicting a floor plan map from which data is generated to compute hand-out threshold data.
Figure 7:
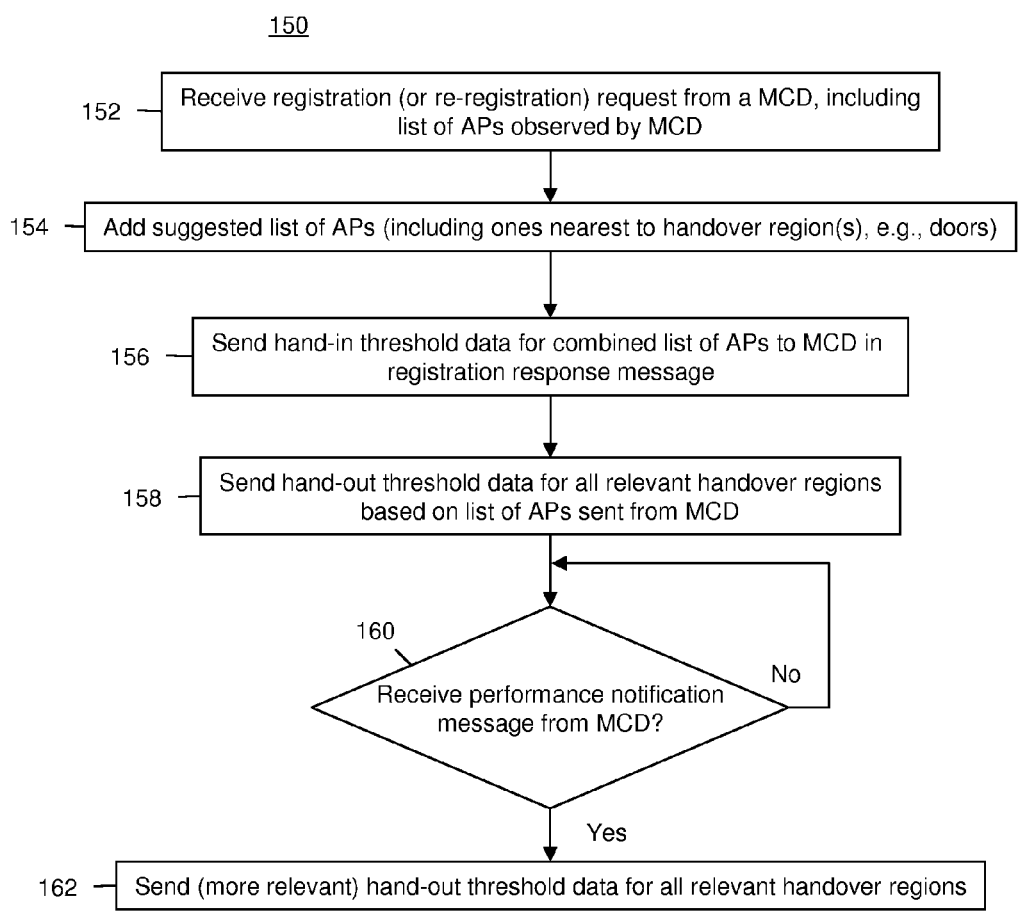
FIG. 7 is a flow chart for further functions of the handover threshold data generation a . . . nd communication process logic in the mobile intelligent roaming server.

The operation of the MIR server 80 in executing the handover threshold data generation and communication process logic 100 is now described with reference to FIGS. 4-7. The functions shown in the flow chart of FIG. 4 may be performed at startup of the MIR server. These functions may be performed again when there is a change indicated for an AP location, transmit power or antenna property. At 110, the MIR server 80 receives network configuration information from the WCS 70 (or one or more other WLAN control devices) as to locations of APs on a floor map of a building, transmit power of each of the APs and antenna properties of each of the APs. The location, transmit power, RF band (e.g., 2.4 GHz or 5 GHz) and antenna properties of an AP determines the receive signal strength information (RSSI) expected with respect to signals transmitted by an AP in the building. In addition, an indication on the floor map of each handover region, e.g., each exterior entrance/exit door to a building is provided to the MIR server 80. For example, a network administrator places graphical elements representing locations of APs on a floor map (as well as enters data for the transmit power and antenna properties used by each AP) and enters information at the WCS 70 about each handover region by "drag and dropping" in a graphical user interface a marker for each handover region on the floor map. Software at the WCS 70 or at the MIR server 80 analyzes the handover region marked on the map to generate data for "threshold boundaries" for the APs placed on the floor map. The MIR server 80 generates hand-in and hand-out thresholds from these threshold boundaries as described hereinafter. Thus, at 120, the MIR server computes and stores (in the MIR database 90) the hand-in threshold data, also referred to as a hand-in threshold vector, for each AP, based on the location, transmit power and antenna properties of the AP. Again, the network configuration information comprises information indicating or representing operating parameters for the one or more access points (location, transmit power, radio frequency channel of operation and antenna properties or configurations for each access point) and locations of one or more handover regions where service to a multi-mode wireless communication device is to be handed-out from the first wireless network to a second wireless network The generation of the hand-in threshold data at 120 is described further with reference to FIG. 5. FIG. 5 shows an example of four APs 30(1)-30(4) on a floor map 25 of a floor of a building. In order to set the hand-in thresholds, the MIR server 80 generates data to draw logical hand-in threshold boundaries around each AP such that the hand-in boundaries extend to the nearest edge or periphery of a coverage area of the WLAN, e.g., wall or edge of the building as depicted in the floor map 25. The boundaries may take a variety of shapes and while FIGS. 5 and 6 show them as circles, this is only by way of a simplified example. Examples of the hand-in threshold boundaries for APs 30(1)-30(4) are shown at reference numbers 122(1)-122(4), respectively. Using the hand-in threshold boundaries 122(1)-122(4), the MIR server computes RSSI thresholds (derived from those boundaries) for a signal transmitted by the corresponding AP based on the RF band, transmit power, location and antenna properties of the AP as well as the radio propagation characteristics in that building. The radio propagation characteristics may be estimated, or estimated and then calibrated using measured data to improve the accuracy of the RSSI threshold calculation. Thus, generally, when an MCD receives a signal from one or more of the APs 30(1)-30(4) in the example shown, and the RSSI measured at the MCD is greater than the RSSI threshold computed at 120 for that AP, the MCD can be assumed to be at a location that is suitable for handing into the WLAN.

More specifically, the MIR server at 120 computes, from the data derived from the threshold boundary, a hand-in threshold (RSSI threshold value) and stores for each AP a hand-in threshold data vector comprising an identifier of the AP, e.g., or in WiFi terminology, a basic service set identifier (BSSID), a channel identifier that identifies the radio frequency channel on which the AP operates, the computed hand-in threshold, an optionally an indication of whether the BSSID is one that is requested by the MCD or provided by the WLAN infrastructure. The RSSI thresholds may be adjusted to account for variations in RF propagation due to multipath and the amount of averaging (i.e., filtering) of measured RSSI samples.

Similarly, at 130, the MIR server computes and stores hand-out threshold data for each AP based on the location of each AP and the location of each handover region. Reference is made now to FIG. 6 for a further description of the function 130. A network administrator marks or draws on the floor plan map 25 the location of each external entrance/exit doorway, corresponding to each handover region. In the example shown in FIG. 6, there is one handover region shown at 132, corresponding to the location of door 27 on the building floor plan 25. The MIR server 80 generates data to logically draw at least a first hand-out threshold boundary for each AP. The first hand-out threshold boundary is drawn so that it just touches the closest edge of the handover region 132 with respect to the AP. For example, the first hand-out threshold boundary is shown at 134(1) for AP 30(1). An optional second hand-out threshold boundary may also be drawn that just touches the furthest edge of the handover region 132 with respect to the AP. For example, the second hand-out threshold boundary is shown at 134(2) for AP 30(1). The first and smaller hand-out threshold boundary is used to indicate power of signals from an access point at a closest point of a handover region, e.g., handover region 132, and the second and larger hand-out threshold boundary is used to indicate power of signals from an access point at a furthest point of a handover region, e.g., handover region 132.

Using the location of the handover region 132, at the first hand-out threshold boundary drawn for each AP, and the RF band, location, transmit power and antenna properties of each AP and the radio propagation characteristics, the MIR server computes at least a first (High) hand-out threshold for each AP derived from the smaller hand-out threshold boundary shown at 134(1) that extends just to a closest point of the handover region 132 with respect to the AP 30(1). If the second hand-out threshold boundary is also drawn for an AP, then the MIR server computes a second (Low) hand-out threshold. The first (High) hand-out threshold is said to be satisfied when the measured RSSI of a signal from that AP is less than the first (High) hand-out threshold. If the first (High) hand-out threshold and the second (Low) hand-out thresholds are computed for an AP, then the first/second (or Low/High) threshold pair is said to be satisfied when the measured RSSI for signals from that AP is less than the first (High) threshold and greater than the second (Low) threshold. The MIR server computes the first hand-out threshold (and optionally) second hand-out threshold for each AP in a manner similar to that shown for AP 30(1). For simplicity, the hand-out threshold boundaries for the other APs are not shown in FIG. 6.

Thus, for each AP, the MIR server computes at 130 a hand-out threshold data vector comprising a BSSID of the AP, channel identifier for the channel on which the AP operates, a first (High) hand-out RSSI threshold, an optional second (Low) hand-out RSSI threshold, and an optional indication of whether the BSSID is client requested of infrastructure-assigned. Each handover region is represented by a set of hand-out threshold data vectors corresponding to one or more APs, and the set of hand-out threshold data vectors for a handover region is also referred to herein as a handover table. Thus, there is a handover table for each handover region. In addition, each handover table comprises a hand-out count threshold that defines how many first hand-out thresholds (or first/second hand-out threshold pairs) need to be satisfied for a hand-out condition to be declared.

Referring back to FIG. 4, the MIR server is ready to communicate the hand-in threshold data and hand-out threshold data to an MCD at 150 after the function 130 is completed. The communication function 150 is now described in more detail with reference to FIG. 7. The MIR server 80 may be configured to use on-demand transmission control protocol (TCP) communication techniques when sending messages to an MCD through the AP to which the MCD is associated. When attempting to associate with the WLAN, the MCD will passively scan numerous WLAN channels and detect beacon signals transmitted from the APs whose coverage areas the MCD is within; an MCD may also use actively scan numerous WLAN channels by transmitting probe request frames to APs, and in return, receiving probe response frames. At 152, after the MCD has connected to ("associated with") an AP in the WLAN, the MIR server receives from the MCD a registration request (or re-registration request) that includes a list of APs observed by the MCD. The list of APs observed by the MCD is denoted the "CL-HI-List" (client-hand-in list). At 154, the MIR server adds more APs to the list received from the MCD, and in particular adds those APs that the MIR server knows are nearest to a handover region of the building. The list of APs that the MIR server suggests to add is denoted "MIR-HI-LIST" (MIR hand-in list).

At 156, the MIR server sends a combined list of APs, denoted HI-List, which is a combination of the MIR-HI-LIST and the CL-HI-List, together with the hand-in threshold data for each AP in the HI-List as well as a hand-in count threshold value. The hand-in count threshold value is a threshold that is used to determine when a hand-in transition condition has been met. There are numerous ways to use the hand-in count threshold value that are described hereinafter. Also at 156, the MIR server may send to the MCD data indicating an averaging algorithm or computation for the MCD to use when computing an average RSSI for signals received from APs. Thus, by the MIR server instructing each MCD as to how to compute an average RSSI, variability across MCDs is minimized as to how the MCDs will make their determination of whether to hand-in or hand-out from the WLAN 20. In a variation, each MCD computes average RSSI values based on the averaging computation that it configured at the time of manufacture or deployment.

At 158, the MIR server sends hand-out threshold data for all relevant handover regions based on the CL-HI-List received from the MCD. This CL-HI-List indicates the general location of the MCD. At this point, the hand-out threshold data that the MIR server sends to the MCD may include hand-out threshold data for a larger set of handover regions than what might be relevant to the MCD once it has transitioned to the WLAN. This is the case because the user of the MCD may walk into one of several possible building entrances served by the MIR server.

At 160, when a MCD has transitioned to the WLAN (hand-in transition completed), the MIR receives a performance notification message from the MCD. In response, at 162, the MIR server sends a more concise set of hand-out threshold data to the MCD for all relevant handover regions. The hand-out threshold data sent at 162 may be different than (e.g., a subset of) the hand-out threshold data sent at 158.

Figure 8:
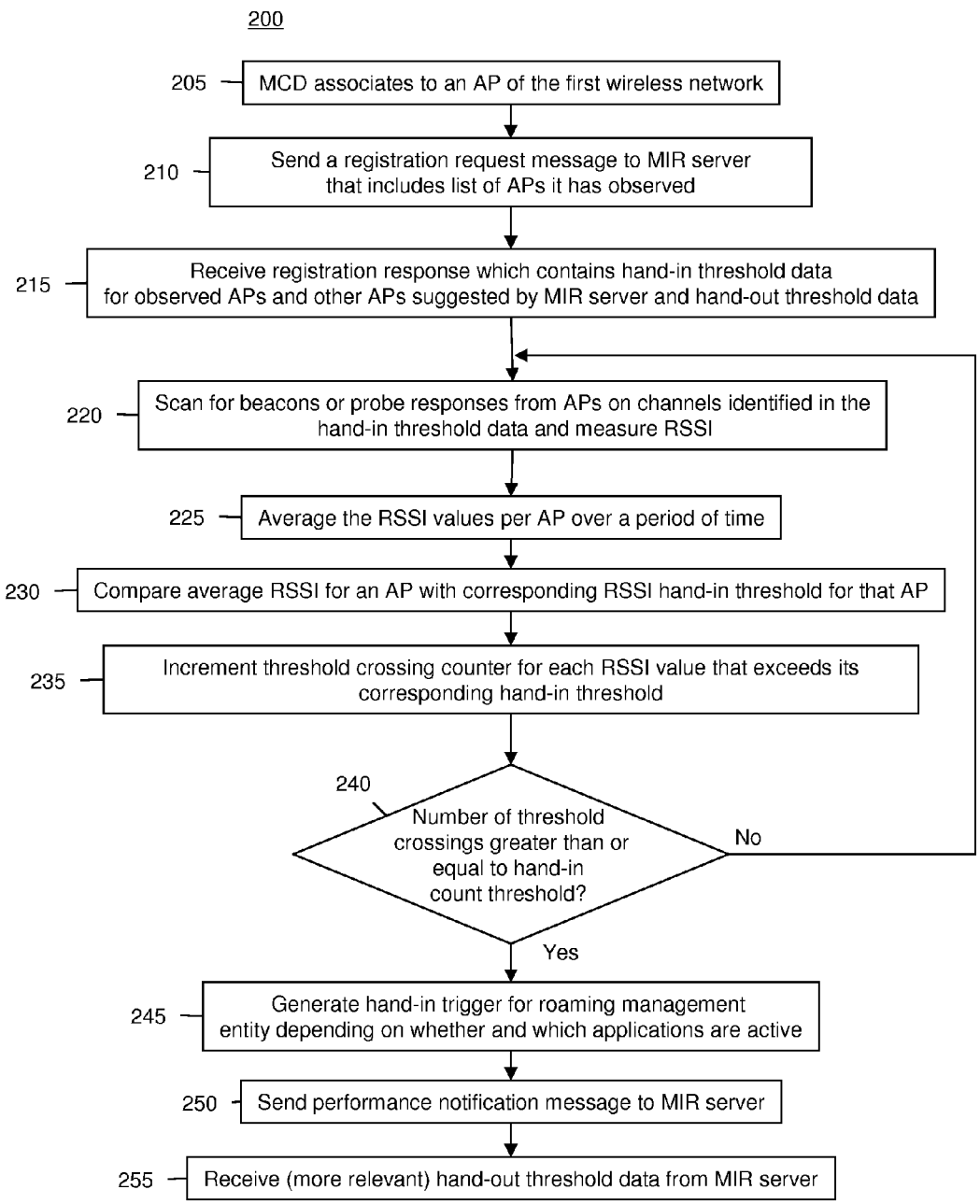
FIGS. 8-10 are flow charts for the client handover process logic in a multi-mode wireless communication device.
Figure 9:
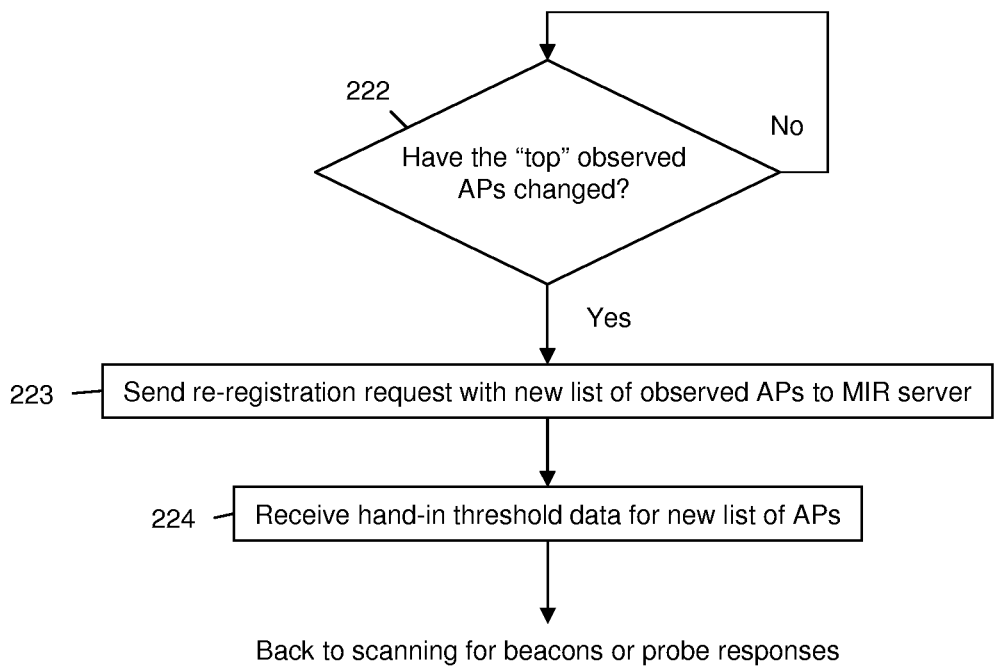
Figure 10:
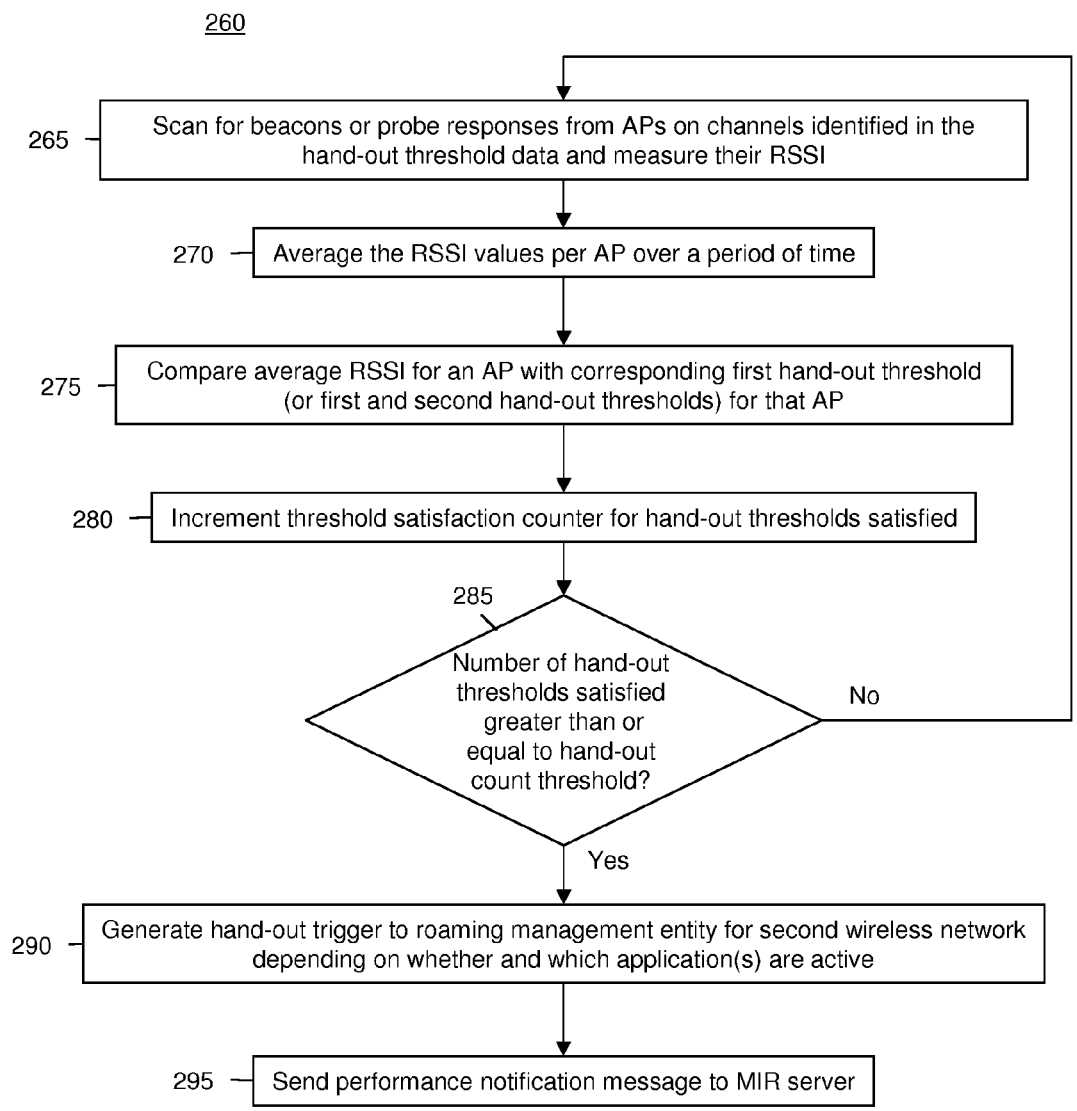

Turning now to FIGS. 8-10, the client handover process logic 200 is described in greater detail. The client handover process logic 200 may be generally described as follows. The MCD receives handover threshold data from the MIR server associated with the WLAN. The MCD receives signals from one or more APs in the WLAN and generated data representing the received signals. Then, the MCD analyzes the data representing the received signals with respect to the handover threshold data to determine when the MCD should initiate hand-in to the WLAN and when to initiate hand-out from the WLAN, or do neither.

Referring to FIG. 8, the process logic 200 begins at 205 when a MCD associates to an AP of the WLAN 20. At 210, the MCD generates a registration request message that it sends to the MIR server via the AP to which it associated and the Internet 45. For example, the MCD may send the registration request message using an "http" request. When the MCD sends the registration request message at 210, it includes with that message a list of the APs that the MCD has observed (from scanning for beacons for APs when it was attempting to associate to an AP). This list is the aforementioned CL-HIT-List. At 215, the MCD receives the registration response message from the MIR server and the registration response message includes the HI-List, the hand-in threshold data for the APs in the HI-List as well as a hand-in count threshold. The MCD also receives the hand-out threshold data at 215.

At 220, the MCD scans the radio spectrum on each of the channels identified in the HI-List for beacons or probe responses from the corresponding APs. Also at 220, the MCD measures the RSSI of received beacon or probe response signals from APs. The first network transceiver module 12 (FIG. 4) in the MCD includes the ability to measure RSSI of received signals. In order to minimize variation due to noise conditions, at 225, the MCD may be configured to average RSSI measurements for signals received from an AP over a period of time, such as one second. Moreover, the MCD may use an averaging computation scheme that is configured at the time of manufacture or may use an averaging scheme indicated in a command received from the MIR server as explained above in connection with FIG. 7.

At 230, the MCD compares the average RSSI values computed at 225 from signals for an AP with the hand-in threshold for the corresponding AP. Thus, if there are 3 APs in the HI-List, the MCD will receive scan and eventually receive beacon or probe response signals from each of the 3 APs, measure RSSI of the received signals for each AP and compute average RSSI values from the RSSI measurements for each of the APs. Then, the MCD will compare the average RSSI values for beacon or probe response signals received from AP1 with the hand-in threshold for AP2, compare the average RSSI values for beacon or probe response signals received from AP2 with the hand-in threshold for AP2, and so on. For each average RSSI value that exceeds its corresponding hand-in threshold, a threshold crossing counter is incremented at 235. For example, when the average RSSI value exceeds the hand-in threshold for AP1, the threshold crossing counter is incremented and when the average RSSI value exceeds the hand-in threshold for AP2, the threshold crossing counter is incremented again, and so on.

At 240, the threshold crossing counter is compared with the hand-in count threshold value. When the threshold crossing counter satisfies the hand-in count threshold, then at 245 the MCD generates a hand-in trigger. Otherwise, the process goes back to function 220 to continue scanning for beacons and probe responses and measuring RSSI values until a hand-in determination is made. At 240, there are many ways to configure the hand-in count threshold. One way is to simply set it to a value ("1" or "2") such that if the accumulated hand-in threshold crossings on any of the APs (across all of the APs) meets or exceeds the hand-in count threshold, then a hand-in condition is triggered. Another way is to set a count threshold that needs to be met on any one of the APs, regardless of the hand-in threshold crossings on other APs. For example, the hand-in count threshold may be set to "2" with the requirement that there must be 2 hand-in threshold crossings based on average RSSI values for beacon or probe response signals received on a single AP. Still another example is for multiple individual APs to satisfy a hand-in threshold count in order to trigger a hand-in. There are numerous other ways to configure the hand-in count threshold mechanism and the above-described techniques are merely meant as examples.

At 245, the MCD generates a hand-in trigger that is sent to a particular roaming management entity depending whether and which applications (voice, data, etc.) are active on the MCD. For example, the hand-in trigger may be sent to the VoIP roaming manager 95 (FIG. 1) when the MCD is in the middle of voice call on the second wireless network when the hand-in determination is made at 240. Also at 245, the MCD is configured to check whether it is located within the handover region so that it does not hand-in when it is located within the handover region. The MCD can determine whether it is located within the handover region by evaluating the RSSI data with the hand-out threshold data (also sent to the MCD by the MIR server 80 in the registration response message). When the MCD determines that the hand-out thresholds are met, then it knows that it is located in a handover region. The MCD is configured not to initiate hand-in to the WLAN 20 when it is located in a handover region.

After the MCD has completed hand-in to the WLAN 20, at 250, the MCD is configured to send a performance notification message to the MIR server. The performance notification message indicates to various WLAN performance parameters that the MCD has observed with respect to its operation in the WLAN. At 255, the MCD receives hand-out threshold data for use by the MCD in determining whether to hand-out to the second wireless network. The hand-out threshold data received at 255 may be more relevant than the hand-out threshold data that the MCD receives at 215 since at this point in time the MCD has completed hand-in to the WLAN. Thus, the MCD is configured to replace the hand-out threshold data received at 215 with the hand-out threshold data received at 255.

Referring to FIG. 9, additional MCD functions are shown that may be performed when the MCD is scanning for beacons and making RSSI measurements. At 222, based on RSSI measurements made from received beacons for the APs in the HI-List, the MCD determines whether, based on RSSI values, a "top" number (e.g., 5 having the strongest RSSI) of APs whose beacons or probe responses are received by the MCD, have changed since receiving the HI-List or the latest update. If such a change is determined by the MCD, then at 223 the MCD sends a re-registration request message together with the updated list of APs (the CL-HI-List) to the MIR server. At 224, the MIR server sends back hand-in threshold data for the APs contained in the updated list, and thereafter continues to scan for beacons and make RSSI measurements. The MCD may be configured to not send a re-registration request message with an updated list of APS if the RSSI values of the "top" APs are less than a predetermined RSSI level, e.g., −75 dBm, which is configurable based on information transmitted from the MIR server to the MCD as part of the registration/re-registration request and response mechanism described above. This prevents unnecessary toggling through different groups of APs that may result for temporarily noisy environments.

In some WLAN configurations where only a single AP is deployed, the foregoing techniques may be simplified. For example, for a single AP scenario, the MIR server may send to the MCD a single hand-in threshold, e.g., −65 dBm, that when exceeded, causes the MCD to hand-in to the WLAN, and a single hand-out threshold (as opposed to a pair of Low/High hand-out thresholds), that when the RSSI falls below, causes the MCD to hand-out from the WLAN.

Turning now to FIG. 10, the MCD functions for hand-out determination shown at 260 are now described. An MCD is configured to perform the hand-out determination process 260 when it is operating with the WLAN 20. It is assumed that the MCD has already received the hand-out threshold data from the MIR server in a registration response, a re-registration response or a performance message response. At 265, the MCD scans for beacons or probe responses from APs on channels identified in the hand-out table(s) received from the MIR server, and makes RSSI measurements on the received signals. At 270, the MCD averages the measured RSSI values using a pre-configured averaging technique or an average technique configured by the MIR server. For example, the MCD averages the RSSI values over a one-second time period. At 275, the MCD compares the average RSSI values for APs with the corresponding hand-out first hand-out thresholds in a handover table to determine whether the average RSSI values is less than the first hand-out threshold of one or more APs in the handover table. In the single hand-out threshold scenario, the single or first hand-out threshold is met when the average RSSI value is less than the first hand-out threshold. In the case where first and second hand-out thresholds are used for an AP, then the MCD compares the average RSSI values with the first hand-out threshold to determine whether the average RSSI value is less than the first hand-out threshold and compares the average RSSI values with the second hand-out threshold to determine whether the average RSSI value is less than the second hand-out threshold. That is, for the first/second hand-out threshold pair to be satisfied (in the event two thresholds are used for an AP), the average RSSI value is less than the first (High) hand-out threshold but greater than the second (Low) hand-out threshold, i.e., Second-RSSI-Threshold<Average-RSSI-value<First-RSSI-Threshold. When a hand-out threshold is met, a hand-out threshold satisfaction counter is incremented at 280. As explained above, for a single AP scenario, only a single threshold may be employed, and when the average RSSI value is less than that threshold, the hand-out threshold satisfaction counter is incremented.

At 285, the hand-out threshold satisfaction counter is compared with a hand-out count threshold value (received from the MIR server with the hand-out threshold data). The MCD makes the comparison at 285 for the hand-out threshold satisfaction counter for each handover table, i.e., each set of hand-out threshold data for a given handover region. When the hand-out threshold count value is met for any handover table, then a hand-out condition is said to be met. As explained above in connection with the hand-out processing described above in connection with FIG. 9, the comparison with the hand-out threshold count value may be configured to be for accumulated hand-out thresholds satisfied across all APs or hand-out thresholds satisfied to a single AP, etc. At 290, the MCD generates the hand-out trigger to a roaming management entity depending on whether and which applications are active on the MCD at the time of the hand-out. For example, the MCD may send a hand-out trigger message to the cellular WAN roaming manager 97 (FIG. 1) if the MCD is in a voice call when the hand-out condition is met. At 290, if the MCD has already handed in to the WLAN, then it will hand-out. However, if the MCD has not handed in to the WLAN, then it does not hand-out. At 295, the MCD sends a performance notification message to the MIR server 80 and the MIR server in reply sends (new or updated) hand-out threshold data (function 162 in FIG. 7).

The handover region(s) may be calibrated to optimize hand-out. For example, a user may carry an MCD into a marked handover region. The MIR server sends a client status request to the MCD which responds with measurement details. The MCD measures the probe responses and beacons from nearby APs, averages them and sends those measurements to the MIR server. The MIR server takes the measurements received from the MCD and computes a pathloss model for the handover region. The pathloss model may be result in adjustments to the hand-out thresholds in the hand-out table(s). Any changes made to the hand-out tables are sent to the MCDs.

Similarly, the hand-in region may be calibrated to improve hand-in performance. A floor plan map may be calibrated using context-aware location techniques. The MIR server then adjusts hand-in threshold data based on the calibration data obtained from the location process, and will send any adjustments to the hand-in threshold data to the MCDs.

The foregoing techniques involve improvements made to both the management server associated with a wireless network, e.g., the MIR server, and to operations within an MCD. Together, the management server and one or more MCDs form, configured as described herein, form a system that delivers information to MCDs to assist them in network transition decisions.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    displaying, at a display screen, a floor map of a building in which a first wireless network comprising a plurality of wireless access points is deployed;
    receiving, via a user interface associated with the display screen, indications of the locations of the plurality of access points with respect to the floor map to enable display of graphical elements representing locations of the access points on the floor map;
    receiving, via the user interface, indications of user selected locations for a plurality of handover regions with respect to the floor map where service is to be handed-out from the first wireless network to a second wireless network, wherein the indications enable display of graphical elements representing locations of the handover regions on the floor map;
    generating data to draw logical hand-in threshold boundaries around each access point such that the hand-in threshold boundaries for one or more of the access points extend to the nearest edge of the building or an adjacent handover region as depicted on the floor map;
    computing hand-in Received Signal Strength Indication (RSSI) values at each of the hand-in threshold boundaries for a signal transmitted by the corresponding access point, wherein the hand-in RSSI values for an access point comprise hand-in threshold data for the access point that are computed based on estimated radio propagation characteristics in the building and the location, Radio-Frequency (RF) band, transmit power, and antenna properties of the access point;
    generating data to draw first and second logical hand-out threshold boundaries around each access point such that the first hand-out threshold boundary for one or more of the access points extends to the nearest edge of an adjacent handover region and such that the second hand-out threshold boundary for the one or more access points extends to the furthest edge of the adjacent handover region;
    computing hand-out RSSI values at each of the first and second hand-out threshold boundaries for a signal transmitted by the corresponding access point, wherein the first and second hand-out RSSI values for an access point comprise first and second hand-out threshold data for the access point that are computed based on estimated radio propagation characteristics in the building and the location, RF band, transmit power, and antenna properties of the access point;
    receiving a registration request from a multi-mode wireless communication device; and
    in response to receiving the registration request, sending the hand-in threshold data and the first and second hand-out threshold data computed for each access point to the multi-mode wireless communication device to assist the multi-mode wireless communication device in determining when to hand-in to the first wireless network and when to hand-out from the first wireless network to the second wireless network is to occur when the multi-mode wireless communication device is located in a first handover region.

2. The method of claim 1, wherein the radio propagation characteristics of the access points are initially estimated and subsequently calibrated using measured data.

3. The method of claim 2, further comprising generating from the hand-in threshold data for a first access point a hand-in threshold vector comprising an identifier of the first access point, a channel indicator that indicates a radio frequency channel that the first access point transmits on, a hand-in threshold, and a hand-in count threshold that indicates a number of hand-in thresholds that need to be met in order satisfy a hand-in condition.

4. The method of claim 2, further comprising generating a first hand-out threshold boundary around a first access point relative to the first handover region, and generating first hand-out threshold data comprising, for a set of one or more access points associated with the first handover region, an identifier of each of one or more access points, a channel indicator that indicates a radio frequency channel on which each of the one or more access points transmit, a first hand-out threshold derived from the first hand-out threshold boundary, and a hand-out count threshold, and wherein the hand-out count threshold indicates a number of first hand-out thresholds that need to be met in order satisfy a hand-out condition for the one or more access points associated with the first handover region.

5. The method of claim 4, wherein generating for each of the one or more access points associated with the first handover region, a second hand-out threshold boundary around each access point and extending to a furthest point of the first handover region with respect to the access point, and generating the hand-out threshold data comprises generating a second hand-out threshold from the second hand-out threshold boundary, and wherein the hand-out count threshold indicates a number of first/second threshold pairs that need to be met in order to satisfy a hand-out condition for the one or more access points associated with the first handover region.

6. The method of claim 1, wherein receiving the registration request comprises receiving a list of one or more access points that were observed by the multi-mode wireless communication device, and wherein sending comprises sending hand-in threshold data and first and second hand-out threshold data for each of the access points identified in the list and for access points that are known to be located near the first handover region.

7. The method of claim 6, and further comprising receiving a re-registration request from the multi-mode wireless communication device, wherein the re-registration request comprises an updated list of one or more access points observed by the multi-mode wireless communication device, and wherein sending comprises sending hand-in threshold data and first and second hand-out threshold data for each of the access points determined to be associated with one or more handover regions relevant to the multi-mode wireless communication device.

8. An apparatus comprising:
a display screen configured to display a floor map of a building in which a first wireless network comprising a plurality of wireless access points is deployed;
a user interface associated with the display screen configured to enable a user to add graphical elements to the floor map at the locations of the plurality of access points and to enable a user to add graphical elements to the floor map at selected locations for a plurality of hand over regions on the floor map where service is to be handed-out from the first wireless network to a second wireless network;
a processor configured to perform one or more data processing functions;
a network interface configured to facilitate communication over a data network;
wherein the processor is configured to:
generate data to draw logical hand-in threshold boundaries around each access point such that the hand-in threshold boundaries for one or more of the access points extend to the nearest edge of the building or an adjacent handover region as depicted on the floor map;
compute hand-in Received Signal Strength Indication (RSSI) values at each of the hand-in threshold boundaries for a signal transmitted by the corresponding access point, wherein the hand-in RSSI values for an access point comprise hand-in threshold data for the access point that are computed based on estimated radio propagation characteristics in the building and the location, Radio-Frequency (RF) band, transmit power, and antenna properties of the access point;
generate data to draw first and second logical hand-out threshold boundaries around each access point such that the first hand-out threshold boundary for one or more of the access points extend to the nearest edge of an adjacent handover region and such that the second hand-out threshold boundary for the one or more access points extends to the furthest edge of the adjacent handover region;
compute hand-out RSSI values at each of the first and second hand-out threshold boundaries for a signal transmitted by the corresponding access point, wherein the first and second hand-out RSSI values for an access point comprise first and second hand-out threshold data for the access point that are computed based on estimated radio propagation characteristics in the building and the location, RF band, transmit power, and antenna properties of the access point;
receive a registration request from a multi-mode wireless communication device; and
in response to a received registration request, send the hand-in threshold data and the first and second hand-out threshold data computed for each access point to the multi-mode wireless communication device to assist the multi-mode wireless communication device in determining when to hand-in to the first wireless network and when to hand-out from the first wireless network to the second wireless network is to occur when the multi-mode wireless communication device is located in a first handover region.

9. The apparatus of claim 8, wherein the radio propagation characteristics of the access points are initially estimated and subsequently calibrated using measured data.

10. The apparatus of claim 9, wherein the processor is configured to generate from the hand-in threshold data for a first access point, a hand-in threshold vector comprising an identifier of the first access point, a channel indicator that indicates a radio frequency channel that the first access point transmits on, a hand-in threshold derived from the hand-in threshold boundary, and a hand-in count threshold that indicates a number of hand-in thresholds that need to be met in order satisfy a hand-in condition.

11. A method comprising:
receiving a representation of floor map of a building in which a first wireless network comprising a plurality of access points is deployed;
receiving locations of the plurality of access points marked by a user with respect to the floor map and the locations of one or more selected handover regions marked by the user with respect to the floor map where service is to be handed-out from the first wireless network to a second wireless network;
receiving transmit power of each of the plurality of access points and antenna properties of each of the access points;
receiving data representing logical hand-in threshold boundaries around a first access point such that a hand-in threshold boundary for the access point extends to the nearest edge of a first a handover region as depicted on the floor map;
computing hand-in Received Signal Strength Indication (RSSI) values at the hand-in threshold boundary for a signal transmitted by the first access point, wherein the hand-in RSSI values for the first access point comprise hand-in threshold data for the first access point that is computed based on estimated radio propagation characteristics in the building and the location, Radio-Frequency (RF) band, transmit power, and antenna properties of the first access point;
receiving data representing first and second logical hand-out threshold boundaries around the first access point such that the first hand-out threshold boundary for the first access point extends to the nearest edge of the first handover region and such that the second hand-out threshold boundary for the first access point extends to the furthest edge of the first handover region;
computing hand-out Received Signal Strength Indication (RSSI) values at each of the first and second hand-out threshold boundaries for a signal transmitted by the first access point, wherein the first and second hand-out RSSI values for the first access point comprise first and second hand-out threshold data for the first access point that are computed based on estimated radio propagation characteristics in the building and the location, RF band, transmit power, and antenna properties of the first access point;

receiving a registration request from a multi-mode wireless communication device; and in response to receiving the registration request, sending the hand-in threshold data and the first and second hand-out threshold data to the multi-mode wireless communication device to assist the multi-mode wireless communication device in determining when to hand-in to the first wireless network and when to hand-out from the first wireless network to the second wireless network is to occur when the multi-mode wireless communication device is located in the first handover region.

12. The method of claim 11, wherein the radio propagation characteristics of the first access point is initially estimated and subsequently calibrated using measured data.

13. The method of claim 12, further comprising generating from the hand-in threshold data a hand-in threshold vector comprising an identifier of the first access point, a channel indicator that indicates a radio frequency channel that the first access point transmits on, a hand-in threshold, and a hand-in count threshold that indicates a number of hand-in thresholds that need to be met in order satisfy a hand-in condition.

14. The method of claim 12, further comprising generating for a set of one or more access points associated with the first handover region, an identifier of each of one or more access points, a channel indicator that indicates a radio frequency channel on which each of the one or more access points transmit, a first hand-out threshold derived from the first hand-out threshold boundary, and a hand-out count threshold, and wherein the hand-out count threshold indicates a number of first hand-out thresholds that need to be met in order satisfy a hand-out condition for the one or more access points associated with the first handover region.

15. The method of claim 14, wherein further comprising generating, for each of the one or more access points associated with the first handover region, a second hand-out threshold boundary around each access point and extending to a furthest point of the first handover region with respect to the access point, and generating the hand-out threshold data comprises generating a second hand-out threshold from the second hand-out threshold boundary, and wherein the hand-out count threshold indicates a number of first/second threshold pairs that need to be met in order to satisfy a hand-out condition for the one or more access points associated with the first handover region.

16. The method of claim 11, wherein receiving the registration request comprises receiving a list of one or more access points that were observed by the multi-mode wireless communication device, and wherein sending comprises sending hand-in threshold data and first and second hand-out threshold data for each of the access points identified in the list and for access points that are known to be located near the first handover region.

17. An apparatus comprising:
a network interface configured to facilitate communication over a data network;
a processor coupled to the network interface, and configured to:
  receive a representation of floor map of a building in which a first wireless network comprising a plurality of access points is deployed;
  receive locations of the plurality of access points marked by a user with respect to the floor map and the locations of one or more selected handover regions marked by the user with respect to the floor map where service is to be handed-out from the first wireless network to a second wireless network;
  receive transmit power of each of the plurality of access points and antenna properties of each of the access points;
  receive data representing logical hand-in threshold boundaries around a first access point such that a hand-in threshold boundary for the access point extends to the nearest edge of a first a handover region as depicted on the floor map;
  compute hand-in Received Signal Strength Indication (RSSI) values at the hand-in threshold boundary for a signal transmitted by the first access point, wherein the hand-in RSSI values for the first access point comprise hand-in threshold data for the first access point that is computed based on estimated radio propagation characteristics in the building and the location, Radio-Frequency (RF) band, transmit power, and antenna properties of the first access point;
  receive data representing first and second logical hand-out threshold boundaries around the first access point such that the first hand-out threshold boundary for the first access point extends to the nearest edge of the first handover region and such that the second hand-out threshold boundary for the first access point extends to the furthest edge of the first handover region;
  compute hand-out Received Signal Strength Indication (RSSI) values at each of the first and second hand-out threshold boundaries for a signal transmitted by the first access point, wherein the first and second hand-out RSSI values for the first access point comprise first and second hand-out threshold data for the first access point that are computed based on estimated radio propagation characteristics in the building and the location, RF band, transmit power, and antenna properties of the first access point;
  receive a registration request from a multi-mode wireless communication device; and
  in response to receiving the registration request, send the hand-in threshold data and the first and second hand-out threshold data to the multi-mode wireless communication device to assist the multi-mode wireless communication device in determining when to hand-in to the first wireless network and when to hand-out from the first wireless network to the second wireless network is to occur when the multi-mode wireless communication device is located in the first handover region.

18. The apparatus of claim 17, wherein the the radio propagation characteristics of the first access point is initially estimated and subsequently calibrated using measured data.

19. The apparatus of claim 18, wherein the processor is configured to generate from the hand-in threshold data a hand-in threshold vector comprising an identifier of the first access point, a channel indicator that indicates a radio frequency channel that the first access point transmits on, a hand-in threshold, and a hand-in count threshold that indicates a number of hand-in thresholds that need to be met in order satisfy a hand-in condition.

20. The apparatus of claim 18, wherein the processor is configured to generate for a set of one or more access points associated with the first handover region, an identifier of each of one or more access points, a channel indicator that indicates a radio frequency channel on which each of the one or more access points transmit, a first hand-out threshold derived from the first hand-out threshold boundary, and a hand-out count threshold, and wherein the hand-out count threshold indicates a number of first hand-out thresholds that need to be met in order satisfy a hand-out condition for the one or more access points associated with the first handover region.

21. The apparatus of claim 20, wherein the processor is configured to generate for each of the one or more access points associated with the first handover region, a second hand-out threshold boundary around each access point and extending to a furthest point of the first handover region with respect to the access point, and to generate the hand-out threshold data by generating a second hand-out threshold from the second hand-out threshold boundary, and wherein the hand-out count threshold indicates a number of first/second threshold pairs that need to be met in order to satisfy a hand-out condition for the one or more access points associated with the first handover region.

22. The apparatus of claim 17, wherein the processor is configured to receive the registration request by receiving a list of one or more access points that were observed by the multi-mode wireless communication device, and to send comprises sending hand-in threshold data and first and second hand-out threshold data for each of the access points identified in the list and for access points that are known to be located near the first handover region.

* * * * *